Inventor
E. R. Lester

April 30, 1963  E. R. LESTER  3,087,555
ROTARY HOES

Filed June 22, 1961  3 Sheets-Sheet 2

Inventor
E. R. Lester
By
Watson, Cole, Grindle & Watson
Attys.

United States Patent Office 3,087,555
Patented Apr. 30, 1963

3,087,555
ROTARY HOES
Edwin Richards Lester, Belsfield Wood Lane,
Hucknall, England
Filed June 22, 1961, Ser. No. 130,209
Claims priority, application Great Britain June 22, 1960
4 Claims. (Cl. 172—94)

This invention relates to rotary hoes and to blades therefor. A rotary hoe, whether mounted on a tractor of whatever type or trailed behind one, comprises a driven shaft running transversely of the direction of movement and carrying a series of blades, usually mounted in groups on radially extending flanges on the shaft. In operation the blades cultivate an area the width of which is roughly equal to the length of the shaft. Each blade has the approximate shape of an L which may be sharp-angled or rounded in varying degree, one arm of the L (hereinafter called the support arm) being apertured adjacent its free end for attachment to the flange or the like: the rest of this arm together with the whole of the other (hereinafter called the digging arm) is adapted to enter the ground as the shaft rotates, whereby to effect cultivation. One convenient kind of rotary hoe comprises a driven shaft mounted from a central gear casing which contains gearing by which drive is transmitted to the shaft from a tractor-driven input shaft. The invention more particularly relates to this kind of rotary hoe, and to blades therefor.

A rotary hoe of the kind described suffers from the disadvantage that, with hitherto conventional constructions, it has been impossible to cultivate a central strip of ground corresponding to the width of the gear casing or support means therefor. The main object of the invention is to provide a rotary hoe and blade therefor enabling this disadvantage to be overcome.

The rotary hoe blade according to the invention comprises a digging arm at least the free end part of which is pivotally mounted intermediately in its length on a lateral extension of the support arm so that when this free end part comes into contact with an obstruction on the side of the pivot remote from said support portion it swings rearwardly to retract and clear the obstruction while when said part of the digging arm comes into contact with the ground it swings in the other direction towards stop means into extended condition so that the blade attacks the ground as a unitary structure.

The invention also provides a rotary hoe of the abovementioned kind having a group of blades such as just described on either side of the gear casing with their digging arms directed towards it and arranged whereby in operation the blades strike and clear the casing and thereafter attack the ground in extended condition so as to leave substantially no uncultivated ground between them. The part of the gear casing which is struck by the pivoted parts of the digging arms preferably carries rubbing pieces cooperating with those parts by means of a stroking action to minimize stresses due to impact.

One embodiment of the invention will now be described by way of example with reference to the accompanying diagrammatic drawings, in which.

Figure 5:
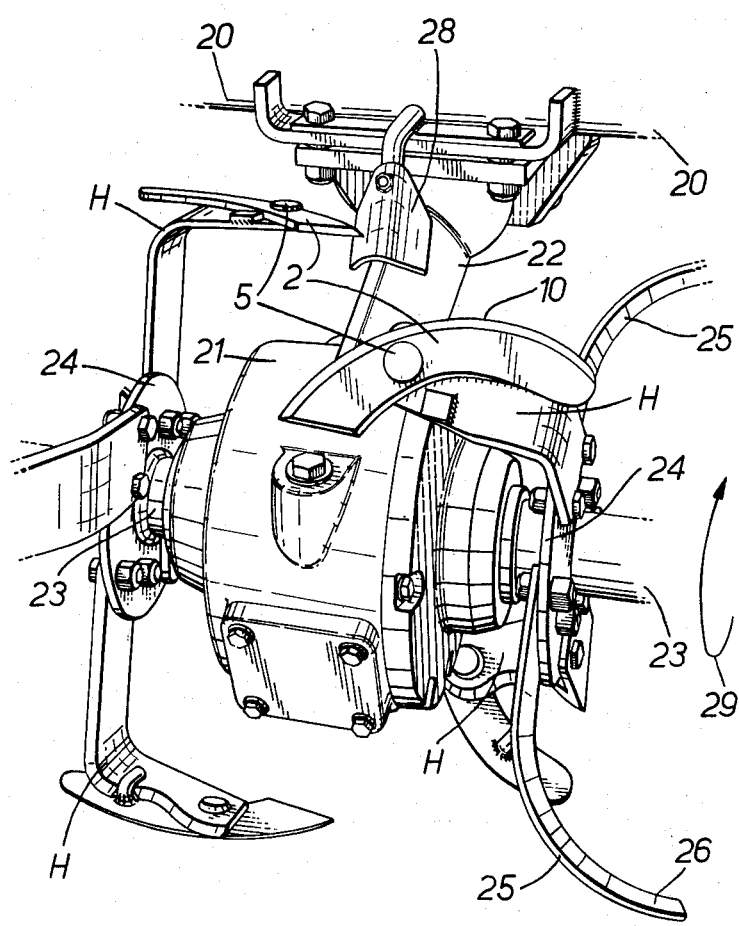
FIGURE 5 is a perspective view of the central part of a rotary hoe incorporating hoe blades such as illustrated in FIGURES 1 to 4.

Referring to the drawings, the hoe blade (FIGURE 1) comprises two main parts, a support arm and a digging arm designated respectively 1, 2 which are disposed at right angles to one another: both arms are formed from stout steel plate. The support arm 1 has two holes 3 at its end remote from the digging arm 2 whereby the blade can be secured on a radially extending flange or the like on a driven shaft, as is shown in FIGURE 5, which will be described later. The other end of the support arm 1 carries an integral flat extension 4 bent out abruptly from the arm and at right angles to the plane thereof.

The digging arm 2 is crescent-shaped and carries a pivot pin 5 about midway in its length by which it is pivotally connected to the extension near the outer end thereof. The pin 5 has a flange 6 overlying the extension 4 and is welded to the digging arm 2 so that (after welding) the digging arm is permanently secured to the extension. In operation the arm 23 is able to move with one flat face sliding over the adjacent flat face of the extension: the clearances at the pivot are arranged to permit this movement without undue friction.

The leading edges 8, 9, 10 of the support arm 1, extension 4 and digging arm 2 respectively are bevelled as shown to minimize the force required to drive the blade through the ground.

The digging arm 2 carries two stops 12, 13 arranged to make contact respectively with leading and trailing edges of the extension 4. The stop 12 has the form of a hook buttressed by a substantial weld fillet 14; the hook can engage in a recess in the bevelled leading edge of the extension 4 with its extremity 15 overlying the face thereof opposite the digging arm. The stop 13 has the form of a small block. The two stops 12, 13 permit an angular movement of the digging arm 2 of some 60°.

Figure 1:
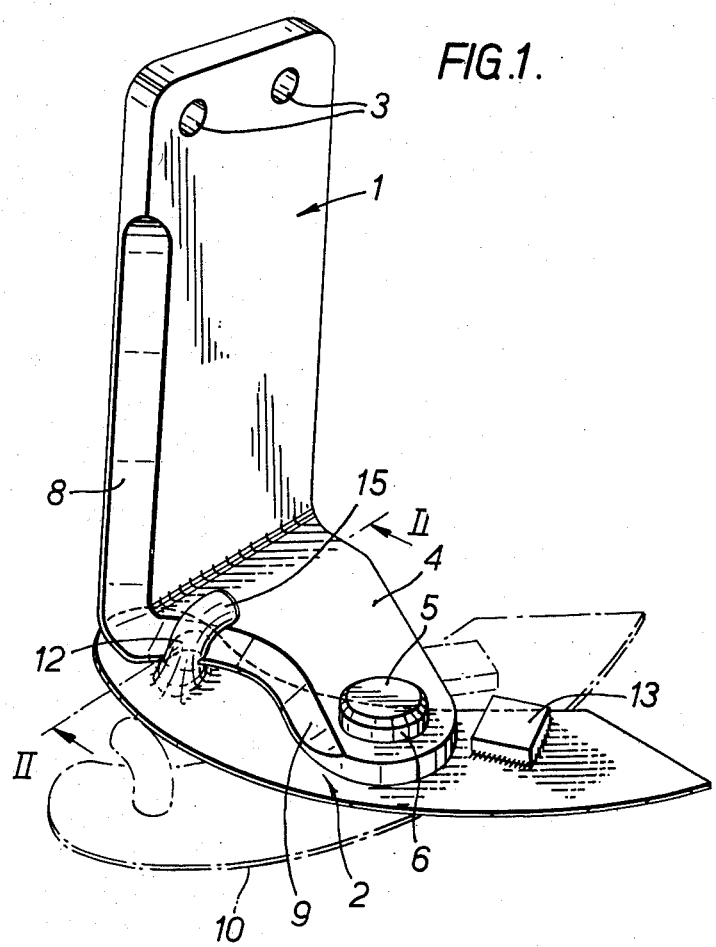
FIGURE 1 shows a hoe blade in perspective.
Figure 2:
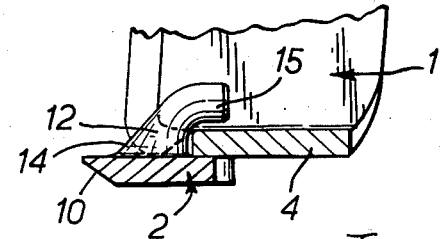
FIGURE 2 is a sectional view showing a portion of the FIGURE 1 blade.
Figure 3:
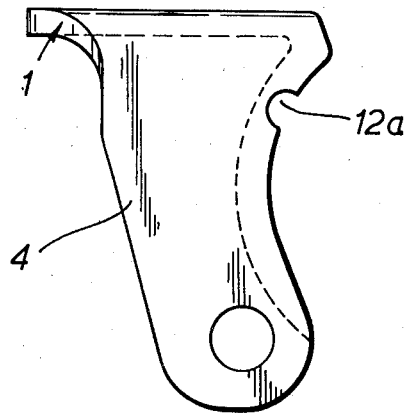
FIGURES 3 and 4 are elevations of a support arm and digging arm respectively which form part of the FIGURE 1 hoe blade.
Figure 4:
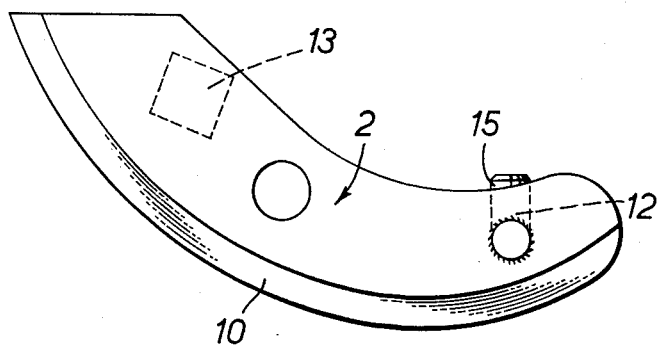

In FIGURE 1 the digging arm 2 is shown in full lines in its extended condition: in this condition the leading edge 10 of the digging arm 2 extends from adjacent the junction of the support arm 1 and extension 4 and sweeps forwardly and then rearwardly, the chord of that part of the edge 10 which lies between the support arm and the pivot pin 5 lying at about a right angle to the plane of the support arm. The length of the leading edge 10 measured perpendicular to the support arm 1 is about two thirds on the support arm side of the pivot pin 5.

The chain-dotted lines in FIGURE 1 show the digging arm 2 in its retracted position. In this position very little of the arm extends beyond the pivot pin 5: the length of leading edge 10 measured perpendicularly to the support arm 1 is reduced by some 1½″. The part of the digging arm 2 which is now leading lies between the support arm 1 and the pivot pin.

The rotary hoe shown in part in FIGURE 5 includes a main transverse member 20 adapted for mounting on the 3-point hydraulic linkage of a four-wheeled agricultural tractor. A gear casing 21 is supported centrally on the member 20 by means of a tubular strut 22. A shaft 23 is supported centrally by the gear casing 21 and carries a series of flanges 24 at intervals along its length: only the two flanges nearest the gear casing are shown. A shaft (not shown) extends through the strut 22 to connect the tractor power take off to gearing within the casing 21 whereby drive is transmitted to the shaft 23. Means (not shown) are provided for controlling the depth to which the rotary hoe can work the soil.

On each flange 23 adjacent the casing 21 are mounted two diametrally opposed hoe blades as described with reference to FIGURES 1 to 4 and here designated H: blades H have their digging arms 2 facing the casing 21, and the blades on one side of the casing 21 are staggered with those on the other side. The flanges 23 nearest the casing 21 each carry also a pair of hoe blades 25 of conventional type having their digging arms 26 directed away from the casing 21. All the other flanges (not shown) on the shaft 23 carry hoe blades such as shown at 25.

A small V-shaped rubbing plate 28 is mounted on the transverse member 20 over and embracing the strut 22. The direction of rotation of the shaft 23 is indicated by the arrow 29, and it will be seen that as the blades H revolve, their digging arms 2 come into contact with the rubbing plate 28 at a position along the arm on the side of the pivot pin 5 away from the support arm. The rubbing plate exerts a stroking action on the leading edge 10 of the digging arm 2 to pivot it to its retracted position so that it clears the strut 22. The leading edge 10 of the digging arm 2 will subsequently come into contact with the ground, first between the pivot 5 and the support arm 1 and then over its whole length. The digging arm will therefore be subjected, both initially and later, to forces tending to pivot it to extended position. Since engagement with the ground is gradual, impact will be minimized. Once the digging arm reaches its extended position the blade acts as a unitary structure. Thus the rotary hoe can cultivate over its entire width, including the central strip corresponding to the width of the gear casing 21 and strut 22.

The formation of the stop 12 as a hook prevents stones or other debris form getting between the extension 4 and the digging arm 2, such as might tend to gain the arm in extended position (thus leading to damage of the gear casing) or to excessive stress on the pivot pin.

Various modifications can be made in the blade above described. Thus instead of pivoting the entire digging arm the free end portion only can be pivoted, and the pivot pin can be carried by the fixed part of the digging arm which in this instance provides the aforesaid lateral extension of the support arm.

I claim:
1. A rotary hoe comprising a frame, a horizontal transverse hoe blade-supporting shaft, mounting means including a gear casing to support the shaft intermediate of its ends, means including gears in the casing to transmit drive to the shaft for rotation thereof in a given direction, a plurality of hoe blades on said shaft, at least the hoe blades adjacent and facing the gear casing each comprising a support arm mounted at one end to the shaft, a lateral extension on said support arm at the other end thereof, a digging arm portion pivoted to the lateral extension and extending laterally of the support arm, and a stop element acting between the digging arm portion and the extension, the digging arm portion being movable relative to the support arm by contact with the ground into a working position defined by the stop element, and said digging arm portion being also movable relative to the support arm by contact of one end of said portion with said mounting means into a retracted position whereby to clear said mounting means.

2. A rotary hoe as claimed in claim 1, wherein the mounting means includes a strut supporting the gear casing and said digging arm portions come successively into contact with a part rigid with the strut.

3. A rotary hoe as claimed in claim 1, wherein the mounting means includes rubbing pieces cooperating with said digging arm portions by a stroking action.

4. A rotary hoe as claimed in claim 3, wherein said rubbing pieces are provided by a plate bent to V-formation.

References Cited in the file of this patent
UNITED STATES PATENTS

| | | |
|---|---|---|
| 1,227,090 | Tanczer | May 22, 1917 |
| 2,856,832 | Galazin | Oct. 21, 1958 |